(12) United States Patent
Van Kommer

(10) Patent No.: US 6,678,659 B1
(45) Date of Patent: Jan. 13, 2004

(54) SYSTEM AND METHOD OF VOICE INFORMATION DISSEMINATION OVER A NETWORK USING SEMANTIC REPRESENTATION

(75) Inventor: Robert Van Kommer, Villars-sur-Glâne (CH)

(73) Assignee: Swisscom AG, Berne (CH)

( * ) Notice: Subject to any disclaimer, the term of this patent is extended or adjusted under 35 U.S.C. 154(b) by 0 days.

(21) Appl. No.: 09/446,362

(22) PCT Filed: Jun. 20, 1997

(86) PCT No.: PCT/CH97/00246

§ 371 (c)(1),
(2), (4) Date: Dec. 20, 1999

(87) PCT Pub. No.: WO98/59486

PCT Pub. Date: Dec. 30, 1998

(51) Int. Cl.[7] .............................................. G10L 13/08
(52) U.S. Cl. ................... 704/260; 704/270; 704/270.1; 704/275; 379/88.01; 379/88.13
(58) Field of Search ................................ 704/260, 270, 704/275, 270.1; 379/88.01, 88.1, 88.17, 88.13, 143, 93.22, 144.05

(56) References Cited

U.S. PATENT DOCUMENTS

| | | | |
|---|---|---|---|
| 5,150,410 A | 9/1992 | Bertrand | 380/28 |
| 5,416,830 A * | 5/1995 | MacMillan, Jr. et al. | 379/88 |
| 6,081,780 A * | 6/2000 | Lumelsky | 704/260 |
| 6,215,858 B1 * | 4/2001 | Bartholomew et al. | 379/88.17 |
| 6,246,672 B1 * | 6/2001 | Lumelsky | 370/310 |
| 6,249,809 B1 * | 6/2001 | Bro | 709/217 |
| 6,320,946 B1 * | 11/2001 | Enzmann et al. | 379/143 |
| 6,477,500 B2 * | 11/2002 | Maes | 704/275 |

FOREIGN PATENT DOCUMENTS

| | | |
|---|---|---|
| EP | 0 559 981 | 9/1993 |
| GB | 2 165 969 | 4/1986 |
| GB | 2 249 701 | 5/1992 |
| WO | 88/05239 | 7/1988 |
| WO | 93/26113 | 12/1993 |
| WO | 96/18258 | 6/1996 |

* cited by examiner

*Primary Examiner*—Susan McFadden
(74) *Attorney, Agent, or Firm*—Oblon, Spivak, McClelland, Maier & Neustadt, P.C.

(57) ABSTRACT

A system of voice information diffusion through a packet-switching telecommunications network starting from a platform for an automatic voice teleservice system. The message diffused by the platform, can be listened to from a plurality of terminals. The messages are transmitted through the telecommunications network in coded form, the code including a semantic representation of messages, and then are converted into audio signals at a network access point of the packet switching telecommunications network. The network access points are distributed geographically and can generally be accessed by a local tariff call.

66 Claims, 1 Drawing Sheet

Figure 1:
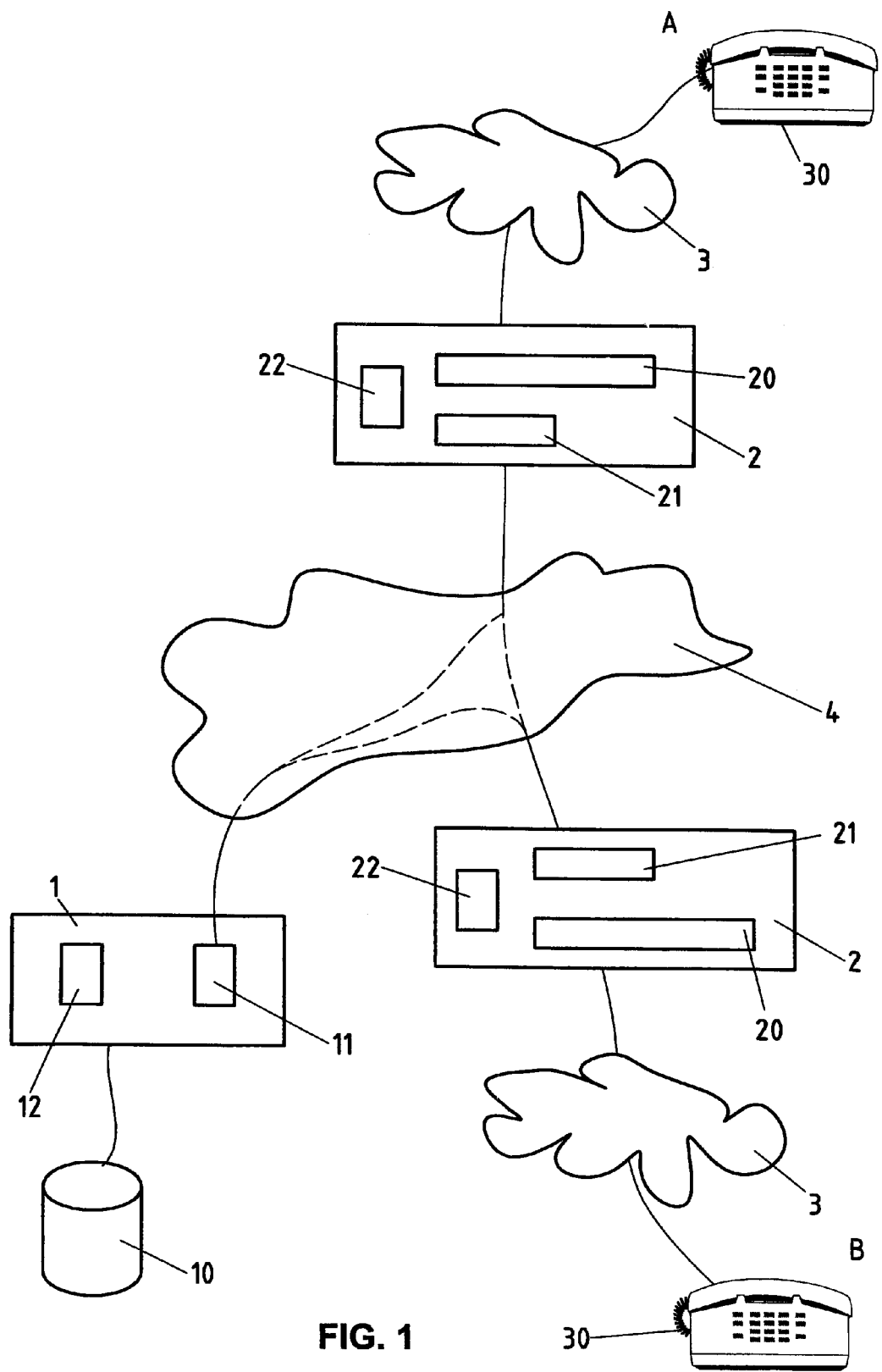

SYSTEM AND METHOD OF VOICE INFORMATION DISSEMINATION OVER A NETWORK USING SEMANTIC REPRESENTATION

This application is the national phase of international application PCT/CH97/00246 filed Jun. 20, 1997 which designated the U.S.

The present invention concerns a system and a method of dissemination of voice information. More specifically, the present invention concerns a voice teleservices system and method, allowing a user to access by means of a telephone, or any type of device equipped with acoustical emission means, information disseminated by a centralized platform in a telecommunications network.

In spite of the emergence of other systems of automatic dissemination of information, for example Internet or teletext, the offer of voice teleservices tends to grow. These services can in fact be used without special equipment, except for a telephone handset, and can thus be easily consulted from anywhere, for example by means of a portable telephone. Moreover, access to the information is possible without particular technical knowledge. Examples of popular voice teleservices include, for example, the talking clock, dissemination of weather forecasts, sports results, stock market prices, etc.

The information disseminated is generally stored in digital form or registered on an audio data recording medium in a centralized platform connected to the telephone network. The user takes the initiative to consult this information by dialing on his telephone handset the telephone number of the platform. An ordinary telephone connection is then established between the centralized platform and the user, and a vocal dialogue is carried out via this connection. The connection is bidirectional, even when the information is disseminated in a sole direction (this is typically the case for a talking clock service), or primarily in one direction (for example in the systems where the only expected responses of the user are limited to the introduction of a password or short-responses of the yes-no type). The load caused on the telecommunications network is thus out of proportion with the actual volume of useful information transmitted.

The progress observed for some years in the field of voice processing, in particular of voice synthesis (TTS systems—"text-to-speech"), of voice analysis and of personal voice recognition, opens the door very wide to new systems of voice teleservices, extending the possibilities offered by the conventional systems. The field of application of these new technologies is no longer limited to unidirectional information dissemination services (such as the talking clock), but also relate to interactive information services, offering possibilities of dialogue between the caller and the voice teleservice platform. These interactive systems are generally known under the anglophone initials IVR (Interactive Voice Response Systems), and are applied in particular to telebanking services. Already known are systems offering the user the possibility to choose, by means of voice commands, the information he wishes to hear, or even change this data, or initiate the launching of application programs executed by the voice teleservice platform. By way of example, the patent document WO88/05239 describes a system allowing polls or voting to be carried out automatically. WO93/26113 describes another largely automatic system of voice messaging.

The voice teleservice systems are generally operated by means of a centralized platform, for clear reasons of updating information and of cost. The length of the telephone connection established thus depends upon the distance between the calling point of the user and the location of the platform. The attractiveness of voice teleservice diminishes greatly, however, for the subscribers who cannot call at local rate. In numerous cases, the management of the telecommunications network therefore proposes a single calling rate for a given teleservice, which penalizes the subscribers closest by and shows a deficit for the calls of subscribers residing farther away.

The patent document EP-A2-0 559 981 describes an interactive voice teleservice system in which the user is connected to the centralized platform by means of a completely numerical connection. The object of this system is essentially to limit the number of analog-to-digital and digital-to-analog conversations between the user and the voice teleservice platform. The problems mentioned above are not resolved by this system, however.

An object of the present invention is therefore to propose an improved voice teleservice system. More specifically, an object of the present invention is to propose a voice teleservice system resulting in a lesser load on the telecommunications network.

These objects are attained in particular by means of the elements of the characterizing parts of the independent claims, the preferred embodiments being indicated in the dependent claims.

The invention has as its point of departure the observation that, in the prior art, the voice messages exchanged, in particular the voice information disseminated by the platform to the caller, require a bandwidth much larger than the minimum required to transmit the sole semantic content of the transmitted information.

The objects of the invention are therefore attained by transmitting, not analog or digital (phonetic) audio signals, but voice messages containing only one piece of information on the semantics of these signals.

In the case of a digital system, the transmission of thousands of successive voice samples, coded, for example, on 8 bits, is thus replaced by the transmission of some characters, for example some ASCII codes corresponding to the representation in text mode or pseudo-text mode of the semantic content of the messages.

The compression rate thus obtained, and therefore the load on the network is very high, typically on the order of 1:500, for example, depending upon the messages and the type of application. The conversion of semantic message into audio signal is carried out preferably by a network access point close to the user, so that an audio signal of large bandwidth is transmitted solely between the network access point of the user, that is, on a fraction of the total distance separating the user from the teleservice platform.

In view of the very low rate of information obtained by means of the method according to the invention, and the irregular nature of this rate, in particular in the case of interactive systems, the coded messages in semantic form are preferably transmitted in the form of packets between the centralized platform and the network access point or points. The telecommunications network preferably connecting the centralized platform to the network access points is therefore made up of a packet transmission network, for example an ATM protocol network and/or Internet (TCP/IP). In the latter case, the network access points can preferably be made up of distributed POPs (Points of Presence) of the Internet network.

The user wishing to call on a voice teleservice system, for example to listen to weather forecasts, calls the closest POP by means of his telephone. This connection can generally be established at local rate. The POP then contacts the centralized platform managing the automatic voice teleservice system, which transmits to him a coded message, including a semantic representation, containing the required information, for example a textual file announcing the weather forecasts for the region under consideration. This textual file is converted into audio signal (analog or digital) by means of a voice synthesis device in the POP (TTS device "text-to-speech"), and the audio signal obtained is transmitted to the user, who can then listen to it.

An ordinary telephone connection is required only between the user and the network access point (POP). Considering the great concentration of Internet network access points, this connection can very often be established at the local tariff. Between the POP and the platform, the connection is preferably of Internet type, and its cost therefore does not depend upon the distance. Moreover, the volume of information exchanged between the POP and the platform is very much reduced, owing to the conversion in semantic form of voice messages.

In the case where a short response time is necessary, for example in the case of interactive communication, the packetization of messages in the Internet can cause a delay as great as the compression. In fact, a packeter generally sends only complete packets. One solution allowing the delay to be reduced is to insert padding octets after the useful message, enabling the packets to be filled, and thus be transmitted immediately. A preferred solution consists in multiplexing a plurality of messages inside each packet, then demultiplexing them inside the telecommunications network.

The distributed network access points preferably contain a cache-type memory which temporarily stores the messages transmitted from the centralized platform. A connection with the platform is therefore not necessary at each enquiry by the user, which contributes to further reducing the load through the telecommunications network. The cache-type memory can either store the messages coded in semantic form, which makes it possible to reduce considerably the size of the required memory, or the synthesized audio signals to limit the number of necessary conversions.

The invention will be better understood with the aid of the description given by way of non-limiting example and illustrated by the sole FIGURE which shows in schematic form a complete system of dissemination of voice information through a telecommunications system.

The description mainly concerns one application of the invention to a voice teleservice system, for example a service for dissemination of weather forecasts accessible by telephone. It is nevertheless important to see that the invention can also be applied to any type of unidirectional, bidirectional or interactive system of dissemination of voice information.

In FIG. 1, the reference numeral 1 designates a centralized platform for a voice teleservice system. The platform 1 furnishes the required information and, in the case of an interactive system, manages the dialogue with the user. The platform 1 contains preferably a memory 10 storing information to be disseminated. Only the semantic content of the information is stored, for example in the form of a textual or pseudo-textual file, or in any other appropriate format. Prosodic markers, or other types of information allowing the quality of the synthesized voice to be improved on the basis of this information, are preferably included in this file. In another embodiment, the memory 10 contains audio data, registered for example on a magnetic band or on any type of suitable analog or digital carrier, which are converted at each reading by voice analysis means into coded data including a semantic representation. In a third embodiment, the information disseminated by the platform 1 is not prepared in advance, but generated by a system of synthesis of messages as a function, for example, of responses furnished by the user in the case of an interactive teleservice IVR.

The platform 1 preferably contains moreover voice analysis means, allowing the responses of the user to be analyzed in the case of an interactive system. The platform 1 can moreover include processing means able to execute any appropriate type of application depending upon the type of teleservice and the commands given by the user, for example to debit a bank account in the case of an interactive telebanking service, or register a response of the user. The means of dialogue management, of voice analysis, of message generation and of processing are preferably implemented in the form of information processing modules able to be executed by the processing means 12. These modules or programs can be stored, for example, on a computerized data carrier, such as a hard disk, floppy disk or CD-ROM, for example, able to be read and executed by a programmable device constituting the platform 1. The platform 1 contains moreover an interface 11 permitting connection to the telecommunications network 4, in this case a packet transmission network of the Internet type. The platform 1 thus constitutes in this example an Internet information server.

The system according to the invention further comprises a plurality of distributed network access points 2. Only two network access points 2 are represented in FIG. 1; the number of network access points can be any, however, and depends in principle upon the size of the telecommunications network 4. In this example the network access points are constituted by points of presence POP in the Internet network. The network access points 2 comprise in a general way an interface 21, allowing them to be connected to the network 4, processing means 20, as well as a cache memory 22 whose function will be described further below. The network access points 2 further comprise interface means, not shown, for example modem-type means, with an access network 3, for example with a conventional fixed or mobile telephone network or with a ISDN or CATV network.

The processing means 20 comprise voice synthesis means, implemented, for example, in the form of an information processing module executable by a universal processor. The voice synthesis means allow the coded voice messages in semantic form to be converted into phonetic audio signals. Different algorithms and commercial programs, generally designated by the name TTS (Text-To-Speech) algorithms, are known for this purpose in the prior art. It goes without saying that the voice synthesis algorithm used must be compatible with the semantic coding adopted by the centralized platform 1, and be able, for example, if necessary, to recognize the prosodic markers or other information characterizing the voice, inserted in the textual file. The voice synthesis algorithm can preferably be downloaded, therefore, from the centralized platform 1 through the Internet. It is thus possible to easily update all the access points 2 during modifications of the semantic coding algorithm used by the platform 1.

The network access point 2 is preferably made up of a computer, for example an all-purpose computer or a specialized communications server, executing an appropriate computer program stored on a suitable computerized data carrier.

The cache memory 22, which can be managed by any known algorithm, temporarily stores the voice messages transmitted from the centralized platform 1 via the network 4. The cache-type memory can either store the semantic representation of the coded messages, which allows the size of the required memory to be considerably reduced, or the synthesized audio signals to limit the number of necessary conversions. The cache memory can, for example, be updated at regular intervals, for example 4 times a day in the case of a teleservice for meteorological information, or after a predefined number of consultations by the users, or only during a consultation by the user, when it turns out that the data in the cache memory are too old to be reliable.

The method according to the invention, executed by the device of FIG. 1, will be now explained with the aid of a simple example of a teleservice disseminating meteorological information. It is well understood that concerned here is an application given by way of non-limiting example, permitting easy understanding of the method according to the invention, but that the invention can likewise be applied to any type of system of dissemination of voice information.

The user wishing to listen to weather forecasts by means of a teleservice system according to the invention dials on his terminal 30 the call number of the service under consideration, in Switzerland, for example, the number 162. A connection is then established through the conventional access network 3 with the closest network access point 2, for example with the closest Internet access provider. Depending upon the density of the network access points 2, this connection can be established at local rate, thus at a very reasonable cost. The user and the teleservice provider thus avoid having to share the cost of a telephone call between the terminal 30 and the device 1, generally farther away.

After establishing the connection, the processing means 20 in the network access point 2 checks whether the required information, in this case the weather forecasts, are contained in the cache memory 22. If this is the case, and if the stored data is reliable, the contents of the cache memory is read and this information can be listened to by the user. If the cache memory 22 contains information already synthesized in sound signal form, this signal can be directly emitted by means of the interface, not shown, with the access network 3, and listened to by means of the loudspeaker in the device 30. If, on the other hand, the cache memory 22 contains only the semantic representation of the coded messages, for example a textual file with possibly prosodic markers, this file is converted by the processing means 20 into an audio signal by means of a TTS voice synthesis module, then transmitted to the device 30.

When the cache memory 22 does not contain the updated information required by the user, or if the device 2 does not include a cache memory, the network access point sends a request to the platform 1 via the packet transmission network 4. In the case of an Internet network, this request can, for example, be made up of an Internet message addressed to the platform 1.

In the case of a unidirectional teleservice, i.e. a teleservice in which the information circulates only from the platform 1 to the user, the platform 1 then manages the required information and sends it to the chosen point of access 2 in coded voice message form including a semantic representation of the information. The voice message sent by the platform 1 can, in this example, be made up of a simple file in text or pseudo-text form, giving the requested weather forecasts. Any other type of semantic coding, for example a coding with a phonetic alphabet, or a coding using prosodic markers, can, however, be used within the framework of the invention.

The volume of information transmitted is very low owing to the semantic coding, and can thus be transmitted very quickly through the telecommunications network 4. The network access point 2 then converts the message coded in semantic form into audio signal through the expedient of the called-upon voice synthesis means, and transmits, as above, this audio signal to the user through the access network 3. The user can then listen to this audio signal by means of the loudspeaker of the device 30.

In the case of a bidirectional teleservice, for example an interactive teleservice allowing the user to influence the functioning of the platform 1, the platform 1 can send a question to the user, for example ask him exactly what information he wishes to listen to. For example, the platform 1 can send a voice message to the user asking him the name of the region to which the weather report must refer. This voice message is transmitted in semantic form to the network access point 2, then converted in the indicated manner into an audio signal which can be listened to by the user of the terminal 30. The user can then respond, either by means of the keypad of the device 30, or preferably vocally.

In the case of a vocal response, the network access point 2 converts, through the expedient of voice analysis means realized in the form of a information processing module executable by the processing means 20, this response into a coded message in semantic form, and transmits this response to the platform 1. The processing means then adopt a behavior depending upon the response, and execute an appropriate procedure depending upon the application. In the case of a teleservice for dissemination of meteorological reports, the procedure can, for example, consist in disseminating a report corresponding to the selected region.

This report is then transmitted in the way described, coded in semantic form and converted into audio signal by the access point 2 so that it can be listened to by the user. Depending upon the management algorithm chosen for the cache 22, this message can also be copied into this cache.

In the simplest case, the format of the coded messages in semantic form is simply of text type. For example, simple ASCII files can be exchanged between the platform 1 and the network access points 2. A textual file does not contain any parameters characterizing the voice of the reader, however, and does not allow a natural voice to be synthesized easily. To improve the synthesis, it is preferable to transmit a pseudo-textual file containing supplementary prosodic markers besides the text.

It is of course possible to transmit only part of the coded message in semantic form, and another part, or other types of messages, in the form of audio data.

Depending upon the type of teleservice application, it often happens that the vocabulary of the messages able to be exchanged is not unlimited. For example, in an interactive system, the only responses which are expected from the user may be instructions of the yes or no type. In this case, the semantic transcription of the vocal messages can be simplified: instead of transmitting the letters YES or NO, depending upon the response of the user, it suffices to transmit a single bit 1 or 0. The rate of compression obtained with respect to a transmission of a response of the yes or no type into audio signal is on the order of at least several thousands. In the same fashion, for each application involving messages likely to be transmitted frequently through the telecommunications network 4, it is possible to optimize the coding by reducing the number of bits used to code these recurrent messages. Ideally, when the vocabulary of the messages exchanged by the method according to the invention is established perfectly in advance, the semantic coding of words of the vocabulary can be carried out so as to minimize the number of bits coding each word, possibly by taking account of the probability of transmission of each word (code of variable length). This transcription, which is also of semantic type, is generally more efficient than the literal transcription of each letter of the words designating a sememe in a given language. The semantic coding can also be based on a prediction of the responses of the user, and evolve dynamically during the dialogue (representation of the semantic prediction). As mentioned, a minimum of information characterizing the voice and/or prosody can preferably be transmitted, for example in the form of prosodic markers incorporated into the semantic representation.

To further reduce the size of the messages, the semantic messages can preferably be transcoded by means of a code for reduction of redundancy, for example by means of a Huffman code or Ziv-Lempel code.

The transmitted messages coded in semantic form contain the information on the content of the message. It is possible at the level of each network access point 2 to attribute another voice to messages converted in audio signals. For example, the allocated voice of the same message could be masculine or feminine depending upon the access point 2 carrying out the conversion of the text in voice. Different distributors of information reselling the information furnished by the platform 1 can easily personalize their teleservice in this way. It is also possible to initiate at the beginning of the communication a dialogue permitting the user to choose a voice suitable for him.

The flexibility of the system can be greatly further extended by adapting the language of the content of the synthesized audio signals on the basis of the semantic representation of the messages. In the example above, a positive response coded in semantic form by one bit 1<sic.> can with the same ease be converted into a voice extract saying "oui", "yes" or "ja", for example. The same applies to all the messages exchanged between the platform 1 and the access points 2, when their semantics can be easily expressed in different languages. Each manager of the network access point 2 can convert in this way the messages coded in semantic form into audio messages expressed in the language predominant at the geographic location under consideration. It is likewise possible to offer the user language selection possibilities, by vocal commands or by means of his keypad, or to use an algorithm which recognizes automatically the language of the calling user to then provide him with the required information in this language. The language of the synthesized audio messages can also be determined according to the indications provided by the client file of the subscribers to the service.

The description above mentions very particularly the case of a user calling the teleservice platform 1 by means of a fixed or mobile telephone handset. It is however possible to use, instead of a telephone, any other type of second device 30 enabling a connection to be established through the packet transmission telecommunications network 4 and equipped with acoustical emission means, for example loudspeaker, permitting the voice messages disseminated by the platform 1 to be listened to. For example, the second device 30 can be made up of a personal or portable computer equipped with a modem and a loudspeaker (intelligent terminal).

In this case, certain operations delegated to the platform 1 or to the network access point 2, in the example embodiment above, can be achieved through an intelligent terminal 30. For example, if the terminal is equipped with means allowing it to be connected directly to the packet transmission network 4, the voice synthesis can be carried out by the intelligent terminal rather than by the network access point 2. The network access point 2 can even be eliminated if the terminal is capable of being directly connected to the platform 1 through the network 4. For example, in the case where the network 4 is a network of Internet type, and the platform 1 a voice server hooked up to the Internet, it is possible by means of a computer, likewise connected to the Internet, to receive voice messages coded in semantic form and disseminated by the platform 1 and to convert these coded messages into audio signals, preferably by means of a voice synthesis software preferably downloaded from the platform 1. The voice synthesis software can preferably be realized in the form of a information processing module of the "plug-in" type for a consultation software (browser) of hypermedia documents transmitted through the Internet network.

The invention can moreover be applied to the exchange of voice information between two users, for example between the two users of the two telephone handsets 30A and B in FIG. 1. The voice of user A is then analyzed and converted into a coded message including a semantic representation by the processing means 20 of the network access point 2 closest to A. This coded message is then transmitted through the packet transmission network 4 to the network access point 2 closest to B, where it is synthesized by synthesis means of the processing unit 20 into an audio signal transmitted to B via the local connection through the access network 3. The responses of B are transmitted to A in similar way in reverse direction. This method allows, for example, long-distance connections at unbeatable tariffs owing to the very great compression obtained by the semantic coding and owing to the transmission by packets. The small size of the coded messages in semantic form allows dialogues to be carried out in real time even when the network 4 is very loaded, which is not always the case for known systems of telephony through Internet ("Internet vocal chat") in which audio-digital data are transmitted. The price to be paid is, of course, a great loss of information relating to the diction or to the pronunciation of the speaker, whose voice is replaced by the impersonal one of the voice synthesizer.

If A and B frequently have conversations, it is possible, in order to diminish this drawback, for them to send, just once, a file containing parameters characterizing their voices and permitting by means of respective voice synthesis to synthesize from the messages received voices as close as possible to those of B and A, respectively.

This method can moreover be used in combination with a classic method of telephony through Internet, to relieve the problem of slowness of transmission of audio signals through the network 4. In this case, the messages are transmitted in classic manner, in the form of audio-digital or analog data. At the same time a message containing the semantic transcription of the audio message, of considerably smaller size than that of the audio message, is transmitted in parallel. This message is generally completely received well before the audio message. If, after a predetermined interval of time, the audio message still has not arrived at its destination, a new audio message is synthesized at the level of the recipient from the message coded in semantic form, and this new message is transmitted to the recipient without waiting for the complete reception of the original audio message. The synthesis of the new audio message from the message coded in semantic form can preferably be carried out by using the recognition of voice parameters of the speaker, acquired during the exchange of prior messages. This method moreover makes it possible for the recipient to have a written transcription of the vocal message.

This method of direct communication between two speakers A and B turns out to be particularly advantageous when the language of the audio signals synthesized from the transmitted messages coded in semantic form is different for A and for B. In this case, it is possible to achieve systems of automatic translation in real time accessing the communications network very little. The voice messages of A, for example in French, are converted into messages containing only semantic information at the level of the network access point closest to A, then transmitted in this coded form to the network access point closest to B. At this network access point, an audio signal in another language, for example in Japanese, is synthesized on the basis of the semantic information received, then transmitted in Japanese for the attention of B. The responses of B are transmitted to A, and translated from Japanese into French in reverse manner.

What is claimed is:

1. A system for disseminating voice information through a telecommunications network, comprising:

at least one first device connected to the telecommunications network and including means to disseminate messages in the telecommunications network; and at least one second device allowing communication with the at least one first device to be established through the telecommunications network (4), and provided with acoustical emission means allowing listening to audio signals corresponding to the messages disseminated by the at least one first device, wherein the messages are transmitted through the telecommunications network in coded form based on a code, the code including a semantic representation of the messages, and wherein the at least one second device is connected to the telecommunications network through at least one distributed network access point, the at least one network access point including voice synthesis means configured to convert the coded messages into audio signals.

2. The system of claim 1, wherein the at least one first device is a platform for a system of automatic voice teleservice.

3. The system of claim 1, further comprising a plurality of network access points distributed geographically, wherein the messages dispatched by the at least one first device destined for at least one second device is transmitted in coded form until a network access point close to the at least one second device, synthesizes the coded messages into audio signals and transmits the audio signals in the form of radio signals to the at least one second device.

4. The system of claim 3, wherein the plurality of network access points are distributed over a plurality of geographic regions, and wherein a language of the audio signals synthesized from the coded messages by the voice synthesis means upon a predominant language at a geographic location of one of the plurality of network access points.

5. The system of claim 1, wherein the telecommunications network is a packet transmission network.

6. The system of claim 1, wherein the telecommunications network is an Internet network, and wherein the at least one second device is an Internet terminal.

7. The system of claim 6, wherein the telecommunications network is a packet transmission network, and wherein a plurality of the disseminated messages can be multiplexed inside each packet.

8. The system of claim 1, wherein the at least one network access point includes speech recognition means for converting audio signals coming from the at least one second device into coded messages including a semantic representation of the audio signals, and means for dispatching the coded messages in the telecommunications network, and wherein the at least one first device is configured to receive the coded messages.

9. The system of claim 8, wherein the at least one first device is a platform for a system of automatic voice information that allows interactive dialogues, and is configured to analyze the coded messages dispatched by the least one second device and to disseminate a response in the telecommunications network based on the coded messages received.

10. The system of claim 1, wherein the means for disseminating messages in the telecommunications network includes means for storing the coded messages, and means for reading the stored messages.

11. The system of claim 1, wherein the means for disseminating messages in the telecommunications network includes means for storing the coded messages in the form of audio signals, means for reading the stored messages and speech recognition means for converting the audio signals into coded messages including a semantic representation.

12. The system of claim 1, wherein the semantic representation optimizes a length of coded messages likely to be frequently transmitted through the telecommunications network.

13. The system of claim 1, wherein the code includes a representation of a semantic prediction of the disseminated messages.

14. The system of claim 1, wherein the coded messages include information characterizing at least one of a voice and a prosody.

15. The system of claim 1, wherein the at least one network access point comprises a cache memory storing the messages disseminated by the at least one first device.

16. The system of claim 15, wherein the cache memory the disseminated messages in coded form, including a semantic representation.

17. The system of claim 15 wherein the cache memory stores the audio signals synthesized from the coded messages.

18. The system of claim 1, wherein the voice synthesis means is integrated into the at least one second device.

19. The system of claim 18, wherein the voice synthesis means is implemented in the form of a plug-in module for an Internet browser.

20. The system of claim 1, wherein the voice synthesis means is programmed at least by one information processing module, and wherein the at least one first device and the at least one network access point comprise complementary means and are configured to cooperate for downloading the information processing module from the first device to the at least one network access point.

21. The system of claim 1, wherein the at least one second device is connected to the at least one network access point through an access network.

22. The system of claim 1, wherein a language of the audio signals synthesized from the coded messages is determined by a user of the at least one second device.

23. The system of claim 1, wherein the semantic representation is a single data bit.

24. A platform for an automatic voice teleservice system configured to be connected to a telecommunications network, comprising:

means for generating voice messages and for disseminating the voice messages in the telecommunications network, wherein the voice messages are disseminated in the telecommunications network in coded form based on a code, the code including a semantic representation of the voice messages.

25. The platform of claim 24, wherein the means for disseminating messages includes means for storing the coded messages in the form of audio signals, and means for reading the stored messages and for speech recognition configured to convert the audio signals into coded messages, including a semantic representation of the audio signals.

26. The platform of claim 24, wherein the platform allows interactive dialogues and is configured to analyze coded messages, including the semantic representation, received through the telecommunications network and to disseminate a response depending upon the coded messages received.

27. The platform of claim 24, wherein the semantic representation optimizes a length of coded messages likely to be transmitted frequently through the telecommunications network.

28. The platform of claim 24, wherein the code includes a representation of a semantic prediction of the disseminated messages.

29. The platform of claim 24, wherein the coded messages include information characterizing at least one of a voice and a prosody.

30. The platform of claim 24, further comprising an interface configured to connect to a packet transmission telecommunications network.

31. The platform of claim 24, further comprising an interface configured to connect to an Internet telecommunications network.

32. The platform of claim 24, further comprising means for tele-exporting through the telecommunications network an information-processing module for voice synthesis permitting conversion of the coded messages including a semantic representation into audio signals.

33. The platform of claim 24, wherein the means for disseminating messages includes means for storing the coded messages, and means for reading the stored messages.

34. The platform of claim 24, wherein the semantic representation is a single data bit.

35. A network access point configured to be connected to a packet-switching telecommunications network comprising:
means for establishing communication with a device connected to the network and for receiving voice messages disseminated by the device;
voice synthesis means for converting coded voice messages including a semantic representation disseminated by the device into audio signals; and
means for dispatching through an access network the audio signals to at least one second device.

36. The network access point of claim 35, wherein a code used to encode the voice messages includes a representation of a semantic prediction of the voice messages.

37. The network access point of claim 35, wherein the coded messages include information characterizing at least one of a voice and a prosody.

38. The network access point of claim 35, further comprising a cache memory for the messages received.

39. The network access point of claim 38, wherein the cache memory stores the messages in coded form including a semantic representation.

40. The network access point of claim 39, wherein the cache memory stores the audio messages synthesized from the coded messages.

41. The network access point of claim 35, further comprising means for at least one of dispatching audio signals synthesized from the coded messages and receiving audio signals to be coded on the telecommunications network.

42. The network access point of claim 35, wherein the telecommunications network is an Internet network.

43. The network access point of claim 35, further comprising means for selecting a language of a content of the audio signals obtained following the conversion of the coded messages in semantic form.

44. The network access point of claim 35, further comprising:
speech recognition means for converting audio signals received from the at least one second device into coded messages including a semantic representation of the audio signals; and
means for dispatching the coded messages in semantic form in the packet-switching telecommunications network.

45. The network access point of claim 35, wherein the semantic representation optimizes a length of coded messages likely to be transmitted frequently through the network.

46. The network access point of claim 35, wherein the semantic representation is a single data bit.

47. A method of communication between a platform for an automatic voice teleservice system, and at least one second device connected to the platform through a network access point and a telecommunications network, comprising:
requesting from the at least one second device an establishment of a connection through the network access point with the platform;
establishing the connection through the telecommunications network;
disseminating from the platform at least one coded voice message in semantic form transmitted through the telecommunications network to the network access point;
converting with the network access point the code messages in semantic form into audio signals by voice synthesis means; and
transferring the audio signals to the at least one second device where the audio signals can be listened to by a user of the at least one second device.

48. The method of claim 47, wherein the code used to encode the voice messages includes a representation of a semantic prediction of the voice messages.

49. The method of claim 47, wherein the message coding in semantic form makes use of information characterizing at least one of a voice and a prosody.

50. The method of claim 47, wherein the messages received from the platform are stored in a cache memory.

51. The method of claim 50, wherein the cache memory stores the coded messages in semantic form.

52. The method of claim 50, wherein the cache memory stores the decoded messages in the form of audio signals.

53. The method of claim 47, wherein the telecommunications network is a packet transmission network.

54. The method of claim 47, wherein the telecommunications network is an Internet network.

55. The method of claim 54, wherein the network is a packet transmission network, and wherein a plurality of messages can be multiplexed inside each packet.

56. The method of claim 47, wherein the semantic representation is a single data bit.

57. The method of claim 47, further comprising:
transmitting from the at least one second device at least one audio signal to the network access point;
converting by the network access point the at least one audio signal into a coded message in semantic form by speech recognition means;

dispatching the coded message in semantic form from the network access point the platform, through the telecommunications network; and receiving at the platform the coded message in semantic form.

58. The method of claim 57, further comprising:

analyzing with the platform the coded voice messages in semantic form dispatched by the at least one second device; and determining a response to dispatch in the telecommunications system depending upon the messages received.

59. The method of claim 47, wherein the message coding in semantic form optimizes a length of coded messages likely to be transmitted frequently through the network.

60. A computerized data carrier configured to be read by a programmable device connected to an Internet network, comprising:

a program of instructions configured to be executed by the programmable device for executing the steps of:
  establishing a connection between a first device and a second device through the programmable device,
  converting code messages in semantic form disseminated by the first device into audio signals by voice synthesis means, and
  transferring the audio signals to the second device where the audio signals can be listened to by a user of the second device.

61. The computerized data carrier of claim 60, wherein the semantic representation is a single data bit.

62. A computerized data carrier configured to be read by a programmable device connected to an Internet network, comprising:

a program of instructions configured to be executed by the programmable device for executing the steps of:
  establishing a connection between the programmable device and a second device through a network access point in the Internet network, and
  disseminating at least one coded voice message in semantic form through the Internet network to the network access point.

63. The computerized data carrier of claim 62, wherein the semantic representation is a single data bit.

64. A system for disseminating voice information through a packet-switching telecommunications system, comprising:

means for disseminating messages in the network and for managing dialogue with a user; and voice synthesis means, wherein the disseminating means is centralized in a platform for an automatic voice teleservice system, wherein the voice synthesis means is distributed in a plurality of network access points distributed in the network, and wherein the messages are transmitted between the platform and the plurality of network access points in coded form, the code used to encode the messages including a semantic representation of the messages.

65. The system of claim 64, wherein the user can listen to the messages by establishing a connection with one of the plurality of network access points through a telecommunications network.

66. The system of claim 64, wherein the semantic representation is a single data bit.

* * * * *